United States Patent [19]
Russell

[11] 3,741,025
[45] June 26, 1973

[54] PULLEYS
[75] Inventor: Michael Frederick Russell, Uxbridge, England
[73] Assignee: C.A.V. Limited, Birmingham, England
[22] Filed: Dec. 1, 1970
[21] Appl. No.: 94,029

[30] Foreign Application Priority Data
Dec. 2, 1969 Great Britain .......................... 58722

[52] U.S. Cl.................. 74/230.4, 74/230.8, 74/443, 74/449
[51] Int. Cl. ............................................. F16h 7/22
[58] Field of Search........................ 74/230.4, 230.8, 74/230.11, 243, 5, 443, 449, 411

[56] References Cited
UNITED STATES PATENTS
687,057  11/1901  Parker ................................. 74/449
1,676,925  7/1928  Pritchard ........................... 74/230.8
1,771,370  7/1930  Benge ..................................... 74/449
3,127,203  3/1964  Poundstone ....................... 74/230.4
3,216,267  11/1965  Dolza ..................................... 74/411
3,385,126  5/1968  Finch ..................................... 74/411
2,674,897  4/1954  Heinish ............................... 74/443

Primary Examiner—C. J. Husar
Attorney—Holman & Stern

[57] ABSTRACT

A pulley comprising a rim portion and a hub portion the two portions being connected together by means which permits relative axial movement between the portions. The means may comprise flexible spokes each spoke being formed in two parts disposed in side by side relationship and having a layer of damping material interposed therebetween.

4 Claims, 6 Drawing Figures

PATENTED JUN 26 1973

3,741,025

SHEET 1 OF 3

INVENTOR
Michael Frederick Russell
Holman & Stern
ATTORNEYS

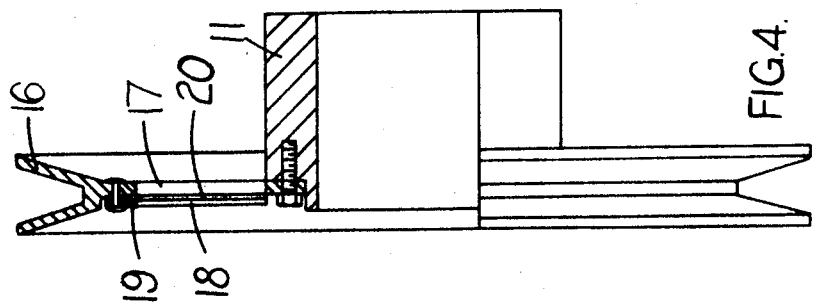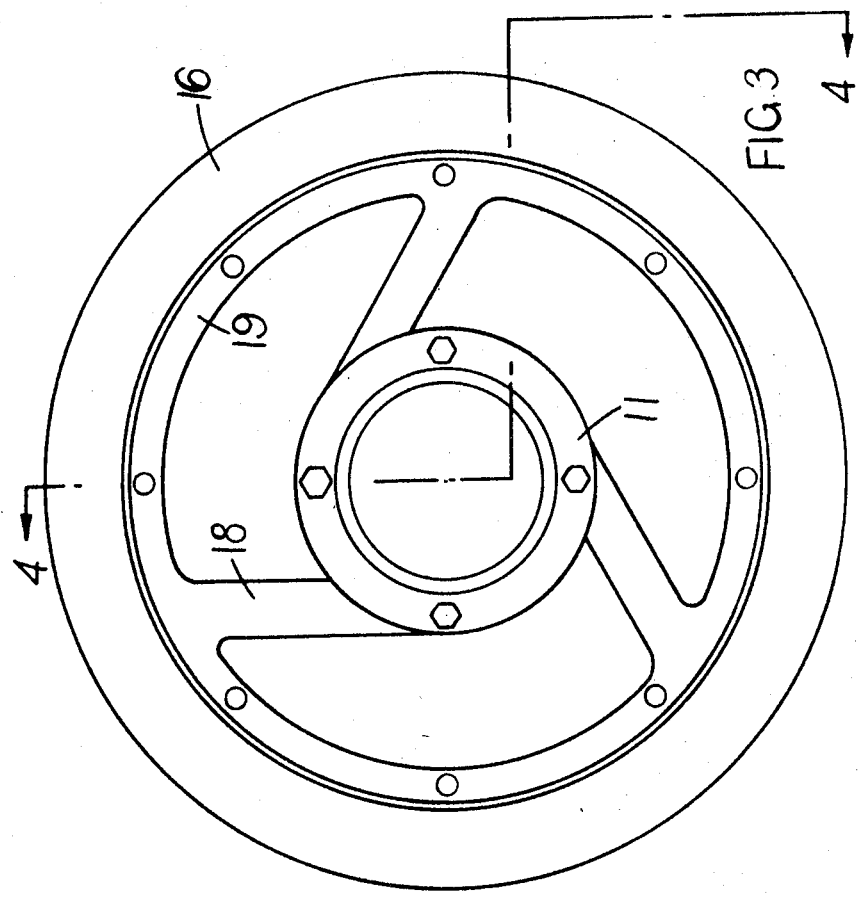

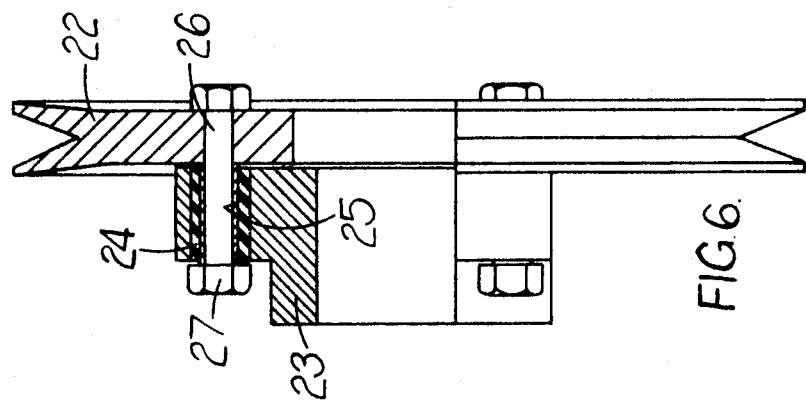
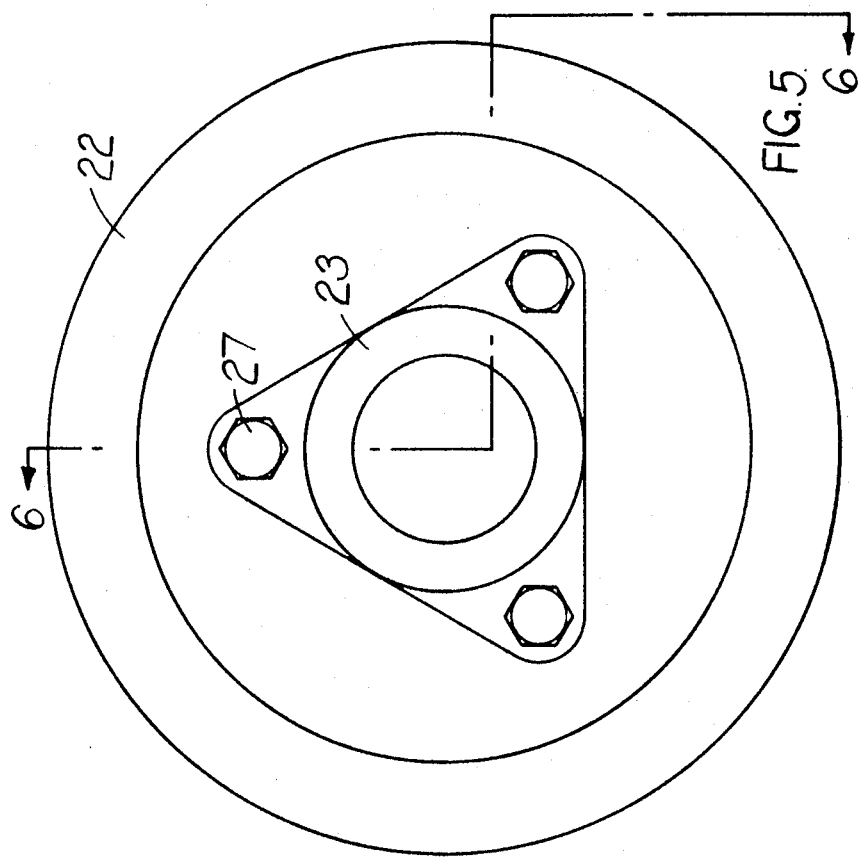

PULLEYS

This invention relates to pulleys of the kind including a rim portion, a hub portion and means connecting the hub portion to the rim portion.

With such pulleys it has been the practice to connect the rim and hub portion by means of a stiff web and when such a pulley is mounted upon a shaft considerable noise can emanate from the rim portion due to axial vibration or movement of the shaft.

The object of the invention is to provide a pulley of the aforesaid kind in which the noise emanating therefrom is minimized.

According to the invention in a pulley of the kind specified said means is constructed to permit relative axial movement of the hub portion and rim portion thereby to minimize the transfer of axial movement from the hub portion to the rim portion.

Figure 2:
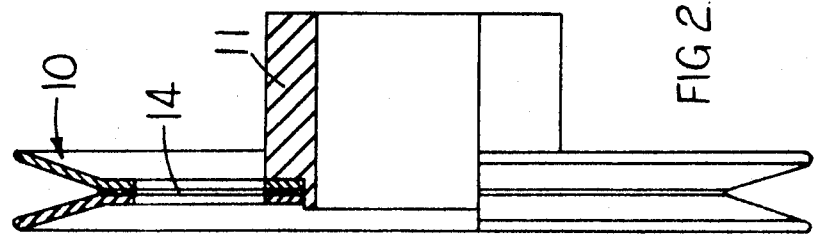
Figure 1:
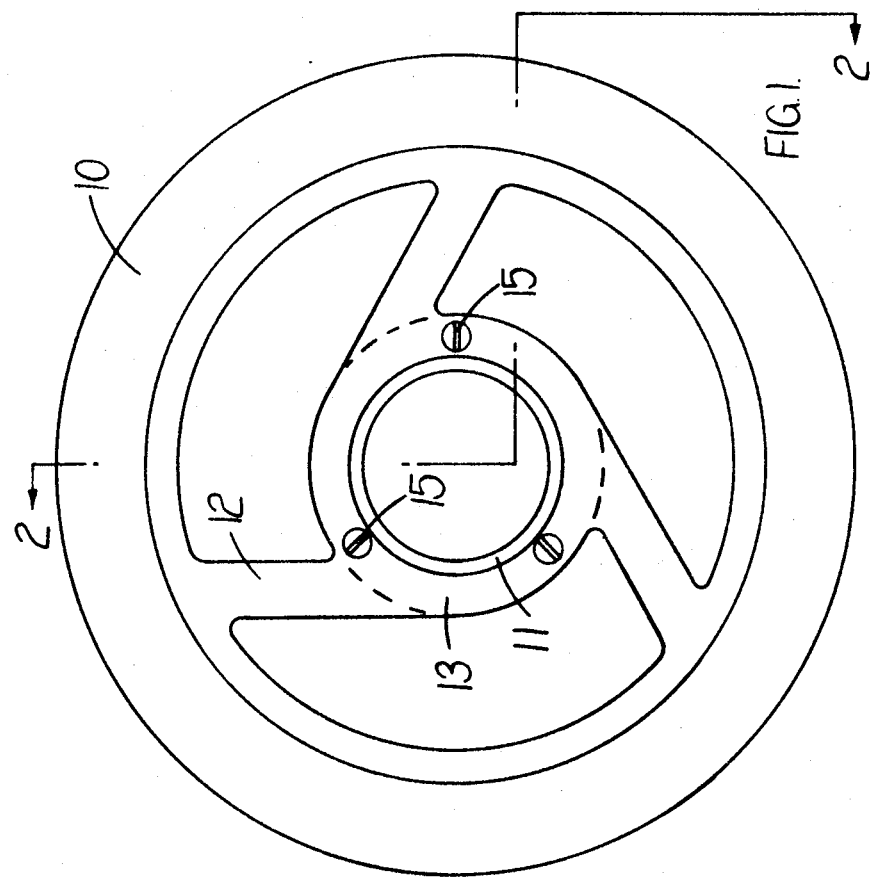

In the accompanying drawings:

FIG. 1 is a side elevation of one example of a pulley in accordance with the invention, FIG. 2 is a section on the line 2—2 of FIG. 1, FIG. 3 is a view similar to FIG. 1 showing another example of a pulley in accordance with the invention, FIG. 4 is a section on the line 4—4 of FIG. 3, FIG. 5 is a view similar to FIG. 1 showing further example of a pulley in accordance with the the invention, and FIG. 6 is a section on the line 6—6 of FIG. 5.

With reference to FIGS. 1 and 2 the pulley comprises a rim portion 10 and a hub portion 11 and these are interconnected by spokes 12. The spokes 12 may be radially disposed or as shown they can be inclined to radii of the hub portion. The hub portion comprises a hollow cylindrical bush with a step defined at one end. The spokes and the rim portion are defined by a pair of substantially identical metal pressings each of which defines one side of the rim portion 10 and at their inner ends the portions of the pressings which define the spokes are defined generally annular portions 13. The outer peripheral portions of the rim portions of the two pressings are inclined outwardly to define a groove for a Vee belt.

Intermediate the pressings there is disposed a layer 14 of damping material such as neoprene bonded cork. The annular portion 13 is secured to the hub portion 11 by means of screws 15 and the spokes act as damped springs which allow relative axial movement of the rim and hub. In this manner it has been found that the noise emanating from the pulley when for instance the hub portion 11 is mounted upon the crankshaft of an engine is some 5–10dB lower than a conventional pulley having a solid cast structure.

In the construction shown in FIGS. 3 and 4 the rim portion 16 is machined from solid material and is secured to the hub portion by means of main spokes 17 formed from a single thickness of material. In addition subsidiary spokes 18 formed integrally with a ring 19 are provided and the ring is secured to the rim. The subsidiary spokes extend alongside the main spokes but are not secured to the hub portion. The main spokes permit relative axial movement of the hub portion and rim portion and damping of this movement is achieved by a layer 20 of damping material interposed between the main and subsidiary spokes.

In the arrangement shown in FIGS. 5 and 6 the rim portion 22 is provided with three angularly spaced but axially extending apertures and the hub portion 23 defines three angularly spaced and axially extending bores in which are located three bushes 24 respectively. The bushes are formed of natural rubber or plastics material and extending within the bushes are three sleeve members 25 which have an axial length which is slightly greater than the axial width of the hub portion. Moreover, the sleeve members are secured to the rim portion 22 by bolts 26. In the static position (as shown) clearances exist between the hub portion 23 and the rim portion 22 and between the heads 27 of the bolts and the hub portion so that limited relative axial movement can take place between the hub and rim portions. The drive forces are transmitted through the bushes, the material in this case being in compression and therefore relatively stiff whilst relative axial movement places the material in shear. In this condition the material is relatively flexible however the material has a high hysteresis and therefore the movement will be damped.

Having thus described my invention what I claim as new and desire to secure by Letter Patent is:

1. A pulley including a rim portion, a hub portion and flexible means connecting the hub portion and rim portion, whereby relative angular movement between the hub portion and rim portion is prevented, relative axial movement of the hub portion and rim portion being allowed to minimize the transfer of axial movement from the hub portion to the rim portion and thereby to minimize the emission of noise from the rim portion due to axial vibration of the hub portion, said means comprising a plurality of spokes extending between the hub portion and rim portion, each of said spokes being formed in two parts disposed in side by side relationship and a layer of damping material interposed between said parts of the spokes.

2. A pulley as claimed in claim 1 in which said parts are secured to the hub portion.

3. A pulley as claimed in claim 2 in which the rim portion is formed from two pressings, each pressing also forming one part of each spoke.

4. A pulley as claimed in claim 2 in which one part only of each spoke is secured to the hub portion.

* * * * *